US008659883B2

(12) United States Patent
Yu

(10) Patent No.: US 8,659,883 B2
(45) Date of Patent: Feb. 25, 2014

(54) LIQUID CRYSTAL DISPLAY DEVICE WITH CONNECTOR

(75) Inventor: Gang Yu, Shenzhen (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 150 days.

(21) Appl. No.: 13/389,544

(22) PCT Filed: Dec. 22, 2011

(86) PCT No.: PCT/CN2011/084413
§ 371 (c)(1),
(2), (4) Date: Feb. 8, 2012

(87) PCT Pub. No.: WO2013/078742
PCT Pub. Date: Jun. 6, 2013

(65) Prior Publication Data
US 2013/0141856 A1 Jun. 6, 2013

(30) Foreign Application Priority Data

Dec. 2, 2011 (CN) .......................... 2011 1 0396016

(51) Int. Cl.
*G06F 1/16* (2006.01)
(52) U.S. Cl.
USPC ......... 361/679.21; 349/64; 200/274; 345/163
(58) Field of Classification Search
USPC .............. 349/58, 61, 64; 361/679.21, 679.41, 361/679.58, 679.57, 679.43, 679.5, 679.54, 361/679.27, 679.01, 679.17, 679.26, 361/679.55, 679.12, 679.29, 749, 720, 714, 361/695; 200/293, 274; 455/575.1, 575.2, 455/575.3, 575.4, 351; 345/163, 168, 184; 49/193, 501
See application file for complete search history.

(56) References Cited

U.S. PATENT DOCUMENTS

| 6,964,131 B2 * | 11/2005 | Herrmann et al. .............. 49/193 |
| 2004/0163322 A1 * | 8/2004 | Herrmann et al. .............. 49/501 |
| 2012/0140139 A1 | 6/2012 | Zhang et al. |

FOREIGN PATENT DOCUMENTS

| CN | 101414071 A | 4/2009 |
| CN | 201218444 Y | 4/2009 |
| CN | 101464572 A | 6/2009 |
| CN | 101832496 A | 9/2010 |
| CN | 101876412 A | 11/2010 |
| CN | 102096218 A | 6/2011 |
| JP | 2010-282829 A | 12/2010 |
| TW | M342524 U | 10/2008 |

* cited by examiner

*Primary Examiner* — Hung Duong
(74) *Attorney, Agent, or Firm* — Muncy, Geissler, Olds & Lowe, P.C.

(57) ABSTRACT

A liquid crystal display device with connector, wherein the front frame includes a front plate and a front plate side frame which defines with a front plate opening and has a first hole; the back plate includes a bottom plate and a bottom plate side frame which defines with a back plate opening, has an area smaller than that of the front plate opening, disposes with a second hole, moreover, a third hole is disposed on the bottom plate at a position corresponding to the second hole; the connector includes a first sheet body and a second sheet body which is provided with a first snap and a second snap, respectively; wherein, during the assemble process of the front frame and the back plate, the first snap engages with the first hole and the second hole, while the second snap engages with the third hole.

10 Claims, 4 Drawing Sheets

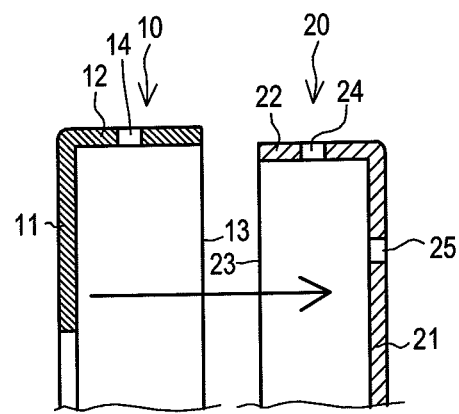
FIG. 2A
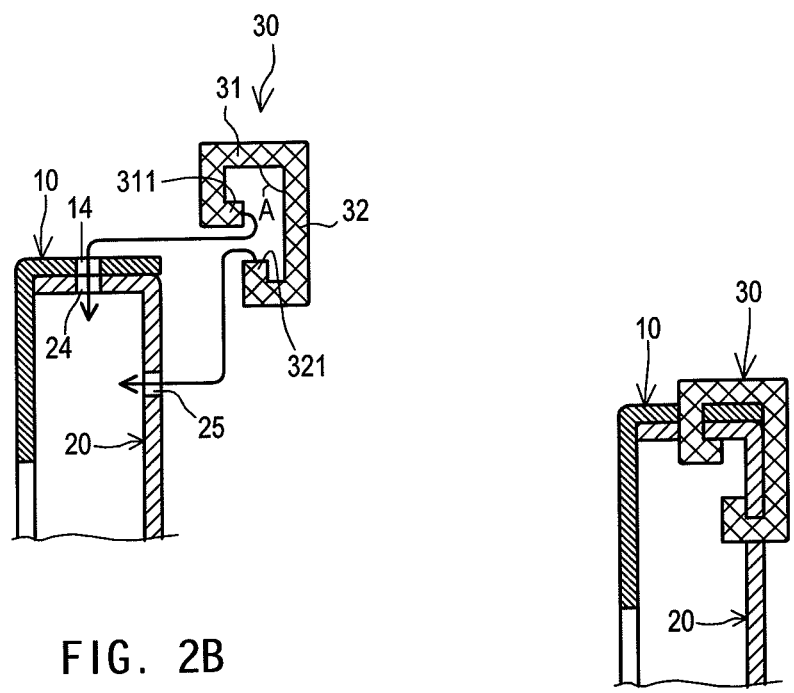
FIG. 2B
FIG. 2C

LIQUID CRYSTAL DISPLAY DEVICE WITH CONNECTOR

FIELD OF THE INVENTION

The present invention relates to a manufacturing technology of a liquid crystal display device, and more particularly to a connecting technology of the frame body of the liquid crystal display device.

BACKGROUND

The conventional liquid crystal display device generally employs snaps or screws to connect the front frame and the back plate.

When using snaps, deformation of the front frame may occur during reworking. As for the screws, with the frame becoming narrower and narrower, eventually there is no space left at the front thereof for screw-locking, and screw-locking at the side may interfere with the manufacturing efficiency; further, stud should be riveted to the back plate, which also causes efficiency degradation in actual manufacturing process.

SUMMARY

In order to overcome the deficiencies of the conventional technology, a primary object of the present invention is to provide a connecting structure capable of easily attaching the front frame and the back plate of the liquid crystal display device.

To solve the technical problems above, the present invention provides a front frame, a back plate and a connector. The front frame includes a front plate and a front plate side frame disposed on the front plate, wherein a front plate opening is defined at the front plate side frame, and a first hole is disposed on the front plate side frame. The back plate includes a bottom plate and a bottom plate side frame disposed on the bottom plate, wherein a back plate opening is defined at the bottom plate side frame, the area of the back plate opening is smaller than that of the front plate opening, a second hole is disposed on the bottom plate side frame, and a third hole is disposed on the bottom plate at a position corresponding to the second hole. The connector includes a first sheet body and a second sheet body forming an included angle with the first sheet body, wherein the first sheet body is provided with a first snap, the second sheet body is provided with a second snap, the opening of the first snap is positioned at the same side with the opening of the second snap; wherein, during the assemble process of the front frame and the back plate, the front plate opening covers the back plate opening, the first hole aligns with the second hole, the connector attached to the front frame and the back plate through the corners of the bottom plate and the front plate side frame, and the first snap of the connector engages with the first hole and the second hole, while the second snap engages with the third hole.

The aforesaid connector is made of flexible plastic material or metal material with high elasticity coefficient.

The aforesaid first snap and/or the end part is disposed at the first sheet body; and the second snap and/or the end part is disposed at the second sheet body.

The aforesaid first snap and/or the second snap include chamfer at the front section thereof.

The end part and/or the two lateral parts of the aforesaid first sheet body are disposed of an extending part protruding from the first snap.

The end part and/or the two lateral parts of the aforesaid second sheet body are disposed of an extending part protruding from the second t snap.

The aforesaid first sheet body and the second sheet body form an included angle of 90 degrees.

Compared with the conventional technology, the present invention directly combines the front frame and the back plate, and employs the snaps of the connector to engage with the side frame of the front frame and the back plate simultaneously to complete the assembly. The connecting technology of the present invention is of simple structure and may be easily reworked; comparing to the prior snap-connecting technology, the present invention is unlikely to cause deformation during reworking, and comparing to the prior screw-locking technology, the present invention is a more appropriate technology for liquid crystal display devices with narrow side frames.

BRIEF DESCRIPTION OF THE DRAWINGS

FIGS. 2A to 2C are assembling views taken along the line 2-2 of FIG. 1;

DETAILED DESCRIPTION OF THE EMBODIMENTS

Reference will now be made in detail to the preferred embodiment of the present disclosure, examples of which are illustrated in the accompanying drawings.

Figure 1:
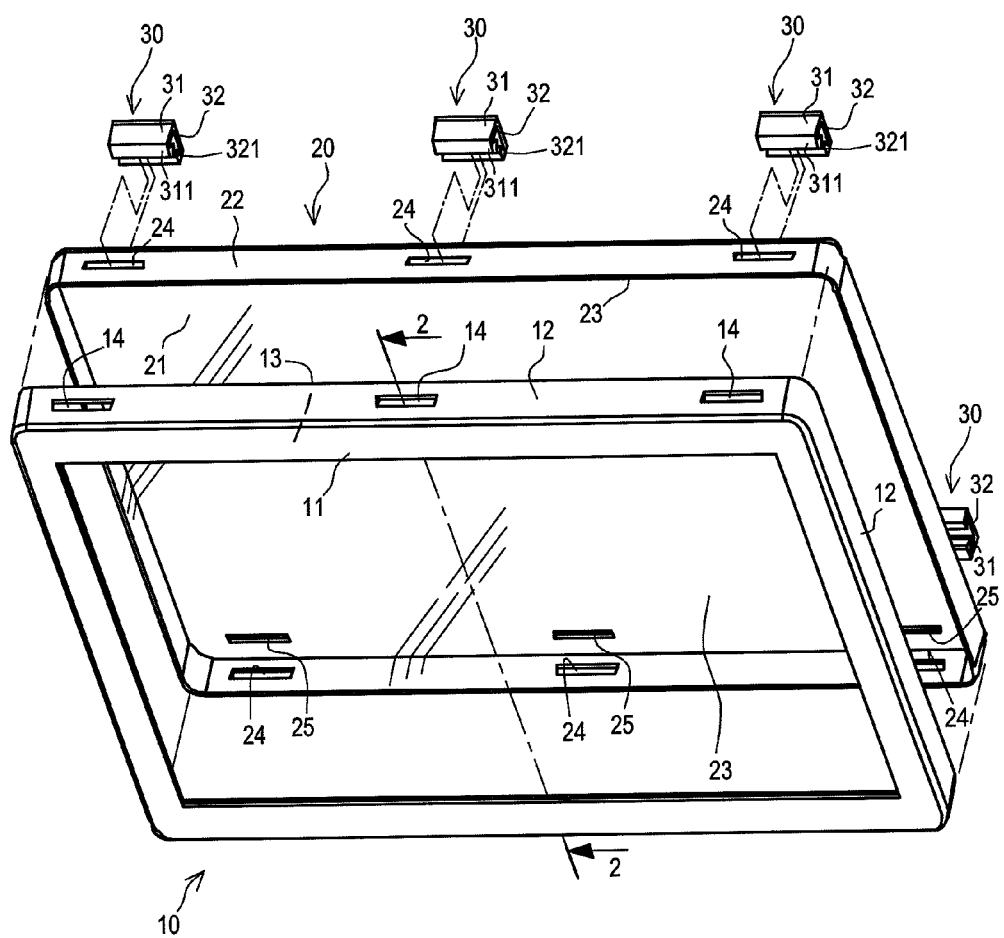
FIG. 1 is a perspective assembling diagram illustrating a liquid crystal display device with connector according to an embodiment of the present invention.

Referring to FIG. 1, according to the present invention, a liquid crystal display device with connector includes a front frame 10, a back plate 20 and a connector 30. The front frame 10 includes a front plate 11 and a front plate side frame 12 disposed on the front plate 11, wherein a front plate opening 13 is defined at the front plate side frame 12, and a first hole 14 is disposed on the front plate side frame 12. The back plate 20 includes a bottom plate 21 and a bottom plate side frame 22 disposed on the bottom plate 21, wherein a back plate opening 23 is defined at the bottom plate side frame 22, the area of the back plate opening 23 is smaller than that of the front plate opening 13, a second hole 24 is disposed on the bottom plate side frame 22, and a third hole 25 is disposed on the bottom plate 21 at a position corresponding to the second hole 24. The connector 30 includes a first sheet body 31 and a second sheet body 32 forming an included angle A with the first sheet body 31, wherein the first sheet body 31 is provided with a first snap 311, the second sheet body 32 is provided with a second snap 321, the opening of the first snap 311 and the opening of the second snap 321 are positioned at the same side of the connector 30.

Referring to FIGS. 2A to 2C, when the front frame 10 and the back plate 20 of the foregoing structure are assembled, the front plate opening 13 covers the back plate opening 23, the first hole 14 aligns with the second hole 24, the connector 30 attached to the front frame 10 and the back plate 20 through the corners of the bottom plate 21 and the front plate side frame 12, and the first snap 311 of the connector 30 engages with the first hole 14 and the second hole 24, while the second snap 321 engages with the third hole 25. Of course, when assembling the connector 30 according to the present invention, the step of engaging the second snap 321 with the third hole 25 may be performed first; the order of assembly is not limited thereto.

Figure 3:
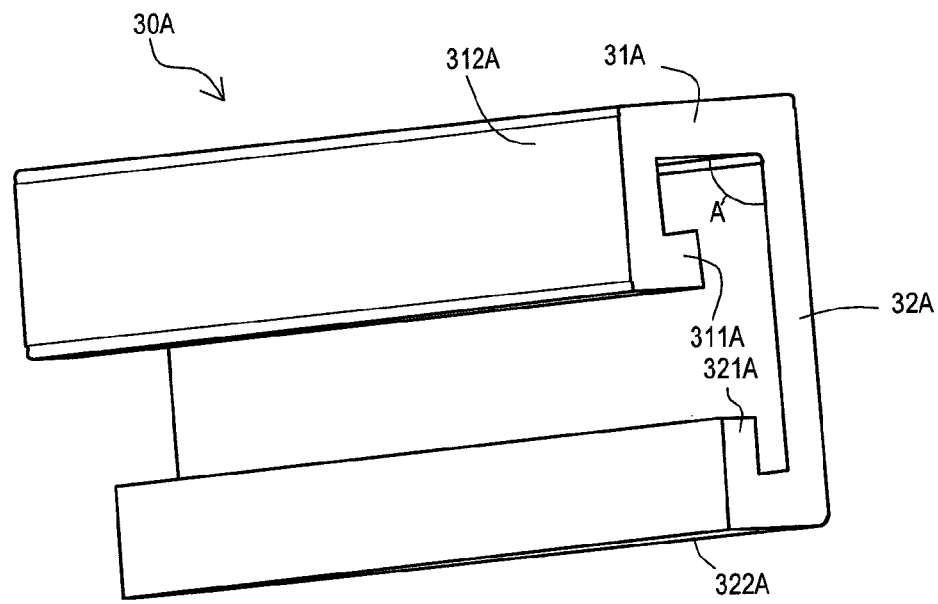
FIG. 3 is a perspective diagram illustrating the connector of a first embodiment of the present invention.

Referring to FIG. 3, a connector 30A is illustrated according to a first embodiment of the connector 30 of the present invention. A first sheet body 31A and a second sheet body 32A of the connector 30A form an included angle A. An end part 312A of the first sheet body 31A is provided with a first snap 311A, an end part 322A of the second sheet body 32A is provided with a second snap 321A, wherein the opening of the first snap 311A and the opening of the second snap 321A are positioned at the same side of the connector 30.

Figure 4:
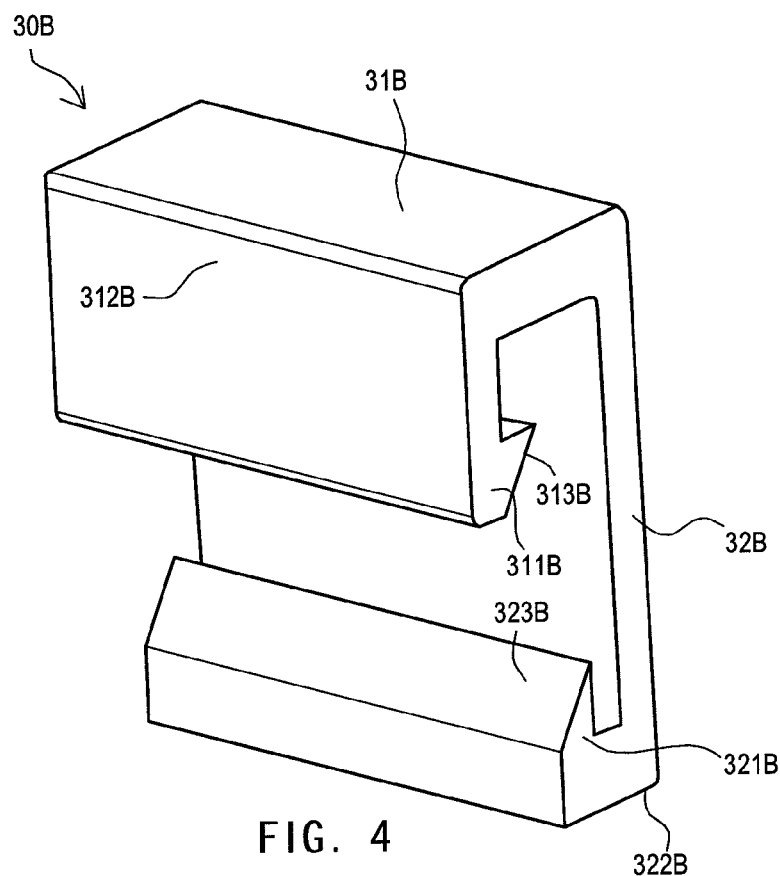
FIG. 4 is a perspective diagram illustrating the connector of a second embodiment of the present invention.

Referring to FIG. 4, a connector 30B is illustrated according to a second embodiment of the connector 30 of the present invention, wherein the structure and components thereof are similar to that of the connector 30A, except that in order to allow an easy assembling process, a chamfer 313B is disposed at a front section of the first snap 311B of the end part 312B of the first sheet body 31B and a chamfer 323B is disposed at a front section of the second snap 321B of the end part 322B of the second sheet body 32B.

Figure 5:
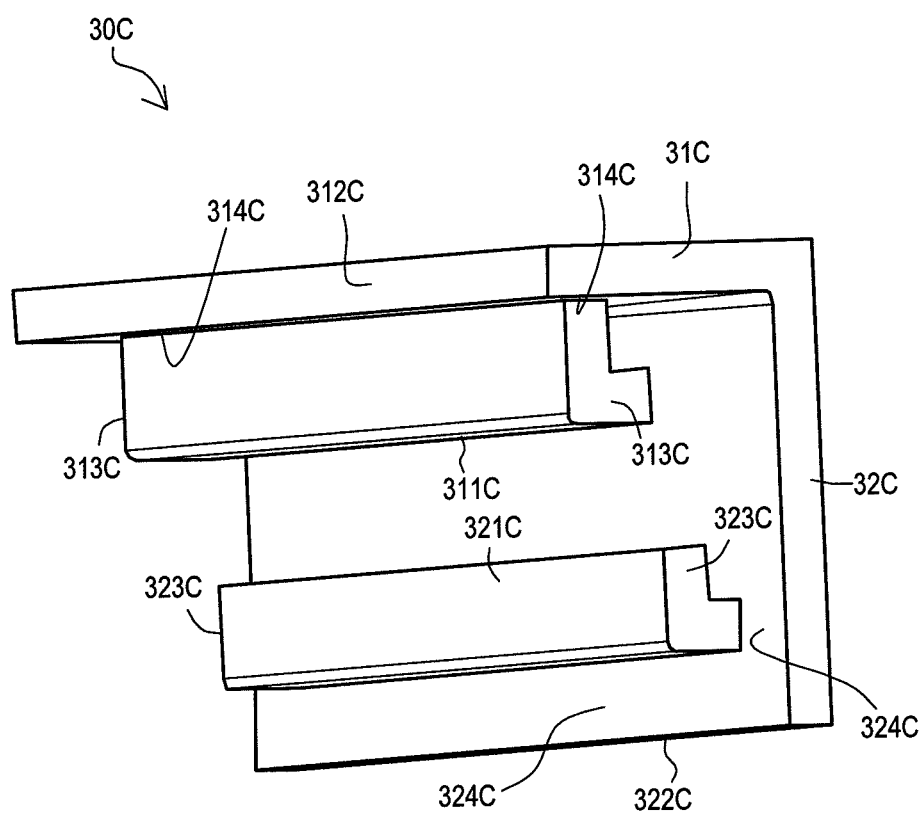
FIG. 5 is a perspective diagram illustrating the connector of a third embodiment of the present invention.

Referring to FIG. 5, a connector 30C is illustrated according to a third embodiment of the connector 30 of the present invention. An end part 312C and/or two lateral parts 313C of the first sheet body 31C are disposed of an extending part 314C protruding from the first snap 311C. Similarly, an end part 322C and/or two lateral parts 323C of the second sheet body 32C are disposed of an extending part 324C protruding from the second snap 321C. After the first snap 311C and the second snap 321C are inserted into the first hole 14, the second hole 24 and the third hole 25, the extending parts 314C and 324C may extend and cover each hole to prevent the light leakage caused by the holes.

It is worth mentioning that the structural features of the connector 30, 30A, 30B and 30C may be combined together. That is, the connector may be realized as only one of the snaps of the two sheet bodies of the connector is with a chamfer while the other one is without the chamfer; or, it may be realized as one of the snaps of the two sheet bodies of the connector is with a chamfer and a sheet body extending part, while the other one has neither.

In comparison with the conventional technology, the present invention directly combines the front frame and the back plate, and employs the snaps of the connector to engage with the side frame of the front frame and the back plate simultaneously to complete the assembly. The connecting technology of the present invention is of simple structure and may be easily reworked; comparing to the prior snap-connecting technology, the present invention is unlikely to cause deformation during reworking, and comparing to the prior screw-locking technology, the present invention is a more appropriate technology for liquid crystal display devices with narrow side frames.

The previous description of the preferred embodiment is provided to further describe the present invention, not intended to limit the present invention. Any modification apparent to those skilled in the art according to the disclosure within the scope will be construed as being included in the present invention.

What is claimed is:

1. A liquid crystal display device with connector comprising:
    a front frame including a front plate and a front plate side frame disposed on the front plate, wherein a front plate opening is defined at the front plate side frame, and a first hole is disposed on the front plate side frame;
    a back plate including a bottom plate and a bottom plate side frame disposed on the bottom plate, wherein a back plate opening is defined at the bottom plate side frame, the back plate opening has an area smaller than that of the front plate opening, a second hole is disposed on the bottom plate side frame, and a third hole is disposed on the bottom plate at a position corresponding to the second hole; and
    a connector including a first sheet body and a second sheet body forming an included angle with the first sheet body, wherein the first sheet body is provided with a first snap, the second sheet body is provided with a second snap, the opening of the first snap is positioned at the same side with the opening of the second snap;
    wherein, during the assemble process of the front frame and the back plate, the front plate opening covers the back plate opening, the first hole aligns with the second hole, the connector attached to the front frame and the back plate through the corners of the bottom plate and the front plate side frame, and the first snap of the connector engages with the first hole and the second hole, while the second snap engages with the third hole.

2. The liquid crystal display device of claim 1, wherein the connector is made of flexible plastic material.

3. The liquid crystal display device of claim 1, wherein the connector is made of metal material with high elasticity coefficient.

4. The liquid crystal display device of claim 1, wherein the first snap is disposed at an end part of the first sheet body.

5. The liquid crystal display device of claim 1, wherein the second snap is disposed at an end part of the second sheet body.

6. The liquid crystal display device of claim 4, wherein the first snap includes chamfer at the front section thereof.

7. The liquid crystal display device of claim 5, wherein the second snap includes chamfer at the front section thereof.

8. The liquid crystal display device of claim 1, wherein the first sheet body is disposed of an extending part protruding from the first snap at an end part and/or two lateral parts thereof.

9. The liquid crystal display device of claim 1, wherein the second sheet body is disposed of an extending part protruding from the second snap at an end part and/or two lateral parts thereof.

10. The liquid crystal display device of claim 1, wherein the first sheet body and the second sheet body form an included angle of 90 degrees.

* * * * *